(12) United States Patent
Xu

(10) Patent No.: US 10,761,576 B2
(45) Date of Patent: Sep. 1, 2020

(54) DIRECT-CURRENT POWER SUPPLY EXPANSION CARD

(71) Applicant: SHENZHEN ORICO TECHNOLOGIES, CO., LTD., Shenzhen, Guangdong (CN)

(72) Inventor: Yeyou Xu, Guangdong (CN)

(73) Assignee: SHENZHEN ORICO TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/079,381

(22) PCT Filed: Apr. 25, 2017

(86) PCT No.: PCT/CN2017/081911
§ 371 (c)(1),
(2) Date: Aug. 23, 2018

(87) PCT Pub. No.: WO2018/040596
PCT Pub. Date: Mar. 8, 2018

(65) Prior Publication Data
US 2019/0179380 A1    Jun. 13, 2019

(30) Foreign Application Priority Data
Aug. 30, 2016   (CN) .................... 2016 2 1006024 U

(51) Int. Cl.
*G06F 1/18*   (2006.01)
*G06F 1/26*   (2006.01)

(52) U.S. Cl.
CPC .............. *G06F 1/185* (2013.01); *G06F 1/186* (2013.01); *G06F 1/26* (2013.01)

(58) Field of Classification Search
CPC .............. H01R 12/7005; H01R 12/716; H01R 12/724; H01R 13/5213; G06F 1/186; G06F 1/26; G06F 1/185
(Continued)

(56) References Cited

U.S. PATENT DOCUMENTS 5,711,677 A * 1/1998 Mui .................. H05K 7/1417
                                                     439/64
6,361,372 B1 * 3/2002 Chiang ............... H01R 13/514
                                                     439/680
(Continued)

FOREIGN PATENT DOCUMENTS

CN    101943933 A    1/2011
CN    202735950 U    2/2013

OTHER PUBLICATIONS

International Search Report for corresponding International Application No. PCT/CN2017/081911 dated Aug. 9, 2017.
(Continued)

*Primary Examiner* — Hien D Vu
(74) *Attorney, Agent, or Firm* — Pearne & Gordon LLP

(57) ABSTRACT

The present disclosure discloses a direct-current power supply expansion card. This direct-current power supply expansion card comprises a circuit board, an input interface arranged on the circuit board, a direct-current output interface arranged on the circuit board, and a fixing insertion plate connected to the circuit board, the fixing insertion plate being used for fixing the circuit board onto a host case. The technical solution of the direct-current power supply expansion card in the present invention converts, by means of the direct-current power supply expansion card, a power supply of a desktop computer into a direct-current power supply capable of charging a hand-held device, thereby improving the convenience and safety of charging for a user.

5 Claims, 2 Drawing Sheets

(58) Field of Classification Search
USPC .......................................... 439/64, 76.1, 378
See application file for complete search history.

(56) References Cited

U.S. PATENT DOCUMENTS

| | | | |
|---|---|---|---|
| 6,935,868 B1* | 8/2005 | Campini | G06F 1/186 |
| | | | 361/748 |
| 10,136,541 B2* | 11/2018 | Rhee | H05K 5/0291 |
| 2007/0214299 A1* | 9/2007 | Lo | G06F 1/185 |
| | | | 710/301 |
| 2008/0046767 A1* | 2/2008 | Hsu | G06F 1/26 |
| | | | 713/300 |
| 2010/0005211 A1* | 1/2010 | Wen | G06F 1/185 |
| | | | 710/302 |
| 2011/0007483 A1* | 1/2011 | Li | G06F 1/185 |
| | | | 361/752 |

OTHER PUBLICATIONS

Written Opinion for corresponding International Application No. PCT/CN2017/081911 dated Apr. 9, 2017.

* cited by examiner

DIRECT-CURRENT POWER SUPPLY EXPANSION CARD

TECHNICAL FIELD

The present disclosure relates to the technical field of computer hardware, particularly to a direct-current power supply expansion card.

BACKGROUND ART

Desktop computers as currently very popular hardware devices have been widely used in various fields, such as official business, and personal learning and entertainment, and are closely related to people's life. Meanwhile, as hand-held devices such as mobile phones, digital cameras, and tablet computers are increasingly widely used, they bring great conveniences to people's life. However, most of the various hand-held devices need a special adapted charger for charging at any time, but the charger generally will not be carried about, at this time, it is quite necessary to charge the hand-held devices with ubiquitous desktop computers.

At present, it is known that the above devices are charged using various data cables, however, as to most of the rear USB ports on a mainboard or front USB ports connecting desktop computers, electricity is shunted from the mainboard of the computer, thus the electricity quantity is small, the loss is great and there is no charging protection, therefore, it takes a relatively long period of time for charging the hand-held devices, and the devices are likely to be damaged due to unstable charging voltages.

SUMMARY

The main object of the present disclosure is to provide a direct-current power supply expansion card, such that a host (mainframe) case (chassis) of a desktop computer is able to provide a direct-current power source to charge hand-held devices, aiming at improving the convenience and safety of charging for a user.

In order to achieve the above object, the direct-current power supply expansion card proposed in the present disclosure includes a circuit board, an input interface provided on the circuit board, a direct-current output interface provided on the circuit board, and a fixing insertion plate connected to the circuit board, and the fixing insertion plate is configured to fix the circuit board on a host case.

Preferably, the input interface includes a D-type (sub) 4 pin power connector and/or a 15 pin SATA power connector.

Preferably, the direct-current output interface includes a 5 v direct-current port (connector) and/or a 12 v direct-current port (connector) provided on a side close to the fixing insertion plate.

Preferably, the circuit board further includes a self-locking switch provided on a side close to the fixing insertion plate.

Preferably, the fixing insertion plate is further provided with through holes in positions corresponding to the direct-current output interface and the self-locking switch.

Preferably, the circuit board further includes an overload protection module.

Preferably, the circuit board further includes a short-circuit protection module.

Preferably, the circuit board is provided with an insertion portion on a side adjacent to the fixing insertion plate, with the insertion portion configured to be inserted into a slot of a mainboard of a computer.

Preferably, the direct-current power supply expansion card further includes a protection cover, and the protection cover is fixed on the circuit board by a bolt.

Preferably, the protection cover is provided with heat dissipation holes

In the technical solutions of the present disclosure, the direct-current power supply expansion card includes the circuit board, the input interface provided on the circuit board, the direct-current output interface provided on the circuit board, and the fixing insertion plate connected to the circuit board, wherein the fixing insertion plate is configured to fix the circuit board on the host case. With the direct-current power supply expansion card, a power source of the desktop computer is converted into a direct-current power source capable of charging the hand-held devices, thus improving the convenience and safety of charging for a user.

BRIEF DESCRIPTION OF DRAWINGS

In order to more clearly illustrate technical solutions of embodiments of the present disclosure or the prior art, figures which are needed for description of the embodiments or the prior art will be introduced briefly below. Apparently, the figures in the following description are merely for some embodiments of the present disclosure, and a person ordinarily skilled in the art still can obtain other figures according to these figures, without using inventive efforts.

REFERENCE SIGNS IN FIGURES

TABLE 1

Figure 1:
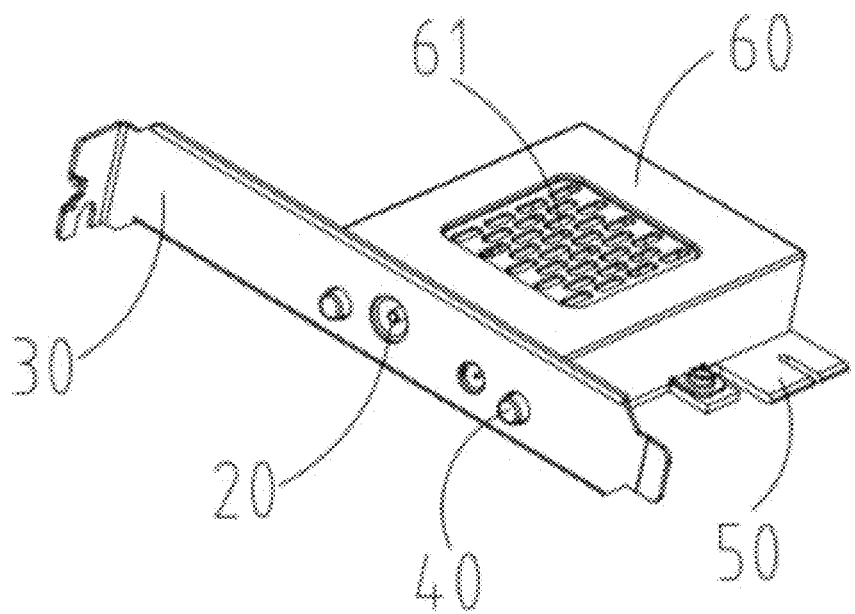
FIG. 1 is a structural schematic diagram of a direct-current expansion card of the present disclosure.

| Reference Sign | Term |
| --- | --- |
| 10 | Input Interface |
| 20 | Direct-Current Output Interface |
| 30 | Fixing Insertion Plate |
| 40 | Self-Locking Switch |
| 50 | Insertion Portion |
| 60 | Protection Cover |
| 61 | Heat Dissipation Hole |

Realization of the object, function features and advantages of the present disclosure will be further described in combination with embodiments with reference to the figures.

DETAILED DESCRIPTION OF EMBODIMENTS

Below technical solutions of the embodiments of the present disclosure will be described clearly and completely in conjunction with the figures of the embodiments of the present disclosure. Apparently, some but not all of the embodiments of the present disclosure are described. All the other embodiments obtained by a person ordinarily skilled in the art without using inventive efforts, based on the embodiments of the present disclosure, shall fall within the scope of protection of the present disclosure.

It should be indicated that all directional indications (for example, upper, lower, left, right, front, rear . . . ) in the embodiments of the present disclosure are merely used to explain relative positional relationship among various parts, motion stations, etc., and if a specific posture changes, this directional indication also changes accordingly.

Besides, descriptions such as "first" and "second" related to in the present disclosure are merely for descriptive purpose, but should not be construed as indicating or implying relative importance or implying the number of the technical feature indicated. Thus, for a feature defined with "first" or "second", at least one such feature can be explicitly or implicitly included. In the description of the present disclosure, unless otherwise explicitly indicated, "a plurality of" means at least two, for example, two, three.

In the present disclosure, unless otherwise specified and defined explicitly, terms such as "connect" and "fix" should be construed in a broad sense. For example, "connection" may be fixed connection, detachable connection, or integrated connection; it may be mechanical connection or electrical connection; it may be direct connection or indirect connection through an intermediate medium; it may be an inner communication between two elements or interaction relationship between two elements, unless otherwise defined explicitly. For a person ordinarily skilled in the art, specific meanings of the above-mentioned terms in the present disclosure can be understood according to specific circumstances.

Besides, technical solutions of various embodiments of the present disclosure can be combined with each other, but should be on the basis that they can be implemented by a person ordinarily skilled in the art. When the combination of the technical solutions is contradictory or cannot be implemented, such combination of the technical solutions should be considered as non-existent, and beyond the scope of protection claimed in the present disclosure.

Figure 2:
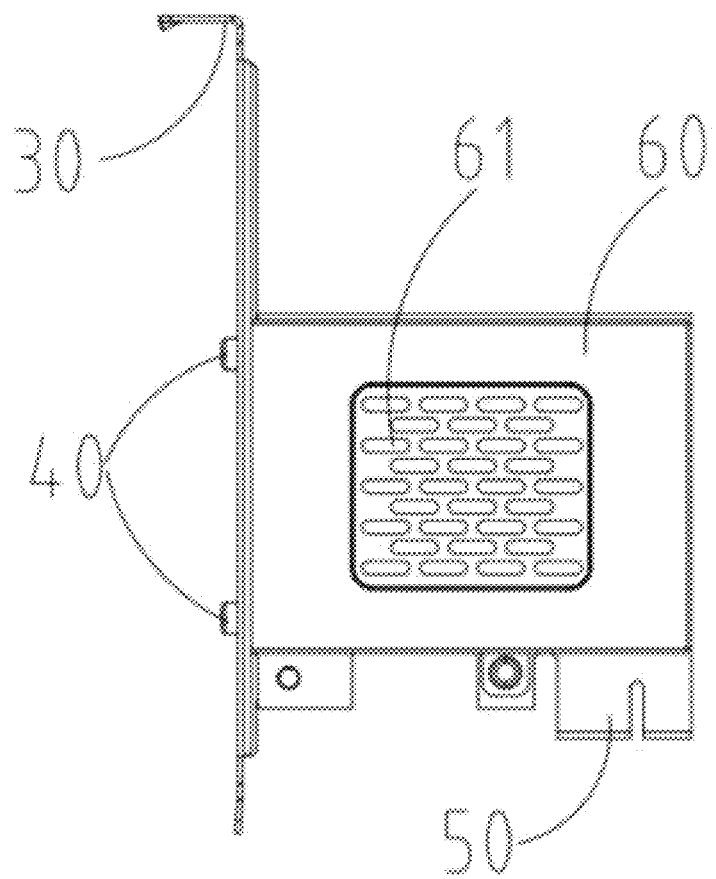
FIG. 2 is a front view of the direct-current expansion card of the present disclosure.
Figure 3:
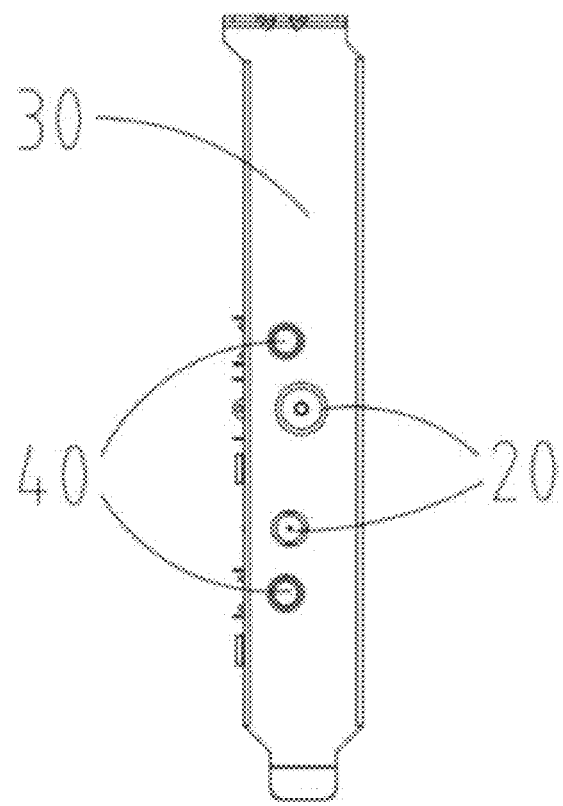
FIG. 3 is a left view of the direct-current expansion card of the present disclosure.
Figure 4:
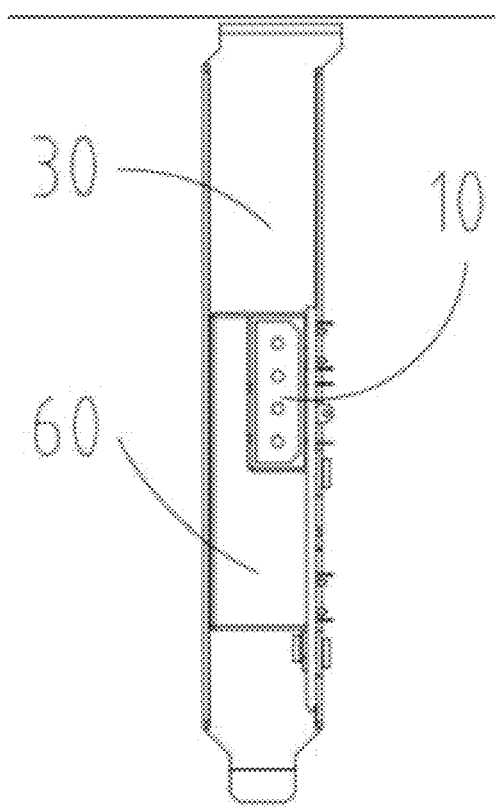
FIG. 4 is a right view of the direct-current expansion card of the present disclosure.

Referring to FIG. 1 to FIG. 4, a direct-current power supply expansion card provided in the present disclosure includes a circuit board (not shown in figures), an input interface 10 provided on the circuit board, a direct-current output interface 20 provided on the circuit board, and a fixing insertion plate 30 connected to the circuit board, wherein the fixing insertion plate 30 is configured to fix the circuit board on a host case (not shown in figures).

In the technical solution of the direct-current expansion card of the present disclosure, the circuit board, the input interface 10 provided on the circuit board, the direct-current output interface 20 provided on the circuit board, and the fixing insertion plate 30 connected to the circuit board are included, wherein the fixing insertion plate 30 is configured to fix the circuit board on the host case. With the direct-current power supply expansion card, a power source of a host of a desktop computer is converted into a direct-current power source capable of charging hand-held devices, thus improving convenience and safety of charging for a user.

Preferably, the input interface 10 includes a D-type 4 pin power connector and/or a 15 pin SATA power connector.

Specifically considering types of power connectors of current desktop computers, the D-type power connector and the 15 pin SATA power connector are usually common. By directly inserting a D-type power plug or a 15 pin SATA power plug of a power source of a host into the corresponding input interface 10, the expansion card can directly input an electric energy of the power source of the host to the circuit board of the expansion card, and upon corresponding conversion, different types of direct-current electric energy output is formed.

Preferably, the direct-current output interface 20 includes a 5 v direct-current port and/or a 12 v direct-current port provided on a side close to the fixing insertion plate 30.

At present, charging voltages of common hand-held devices are mostly 5 v, 9 v, and 12 v, therefore, output interfaces of corresponding specifications are chosen in the present technical solution, thus the hand-held devices to be charged can be better adapted.

Preferably, the circuit board further includes a self-locking switch 40 provided on a side close to the fixing insertion plate 30.

By providing the self-locking switch 40 on a side of the circuit board close to the fixing insertion plate 30, after inserting a plug of a power cable into the direct-current output interface 20, a user presses down the self-locking switch 40 to start to charge a device, when the charging needs to pause or the charging is completed, the self-locking switch 40 is pressed down again such that it is reset and cuts off a power output of the direct-current output interface 20, which can be more convenient for the user to control the charging process, and improve the safety.

Preferably, the fixing insertion plate 30 is further provided with through holes (not denoted) in positions corresponding to the direct-current output interface 20 and the self-locking switch 40.

By further providing the fixing insertion plate 30 with the through holes in the positions corresponding to the direct-current output interface 20 and the self-locking switch 40, a power cable of the device to be charged can be directly inserted into the direct-current output interface 20 from a rear portion of the host case of the computer, thus realizing rapidity of the operation.

Preferably, the circuit board further includes an overload protection module (not shown in figures).

By providing the overload protection module on the circuit board, safety of the device to be charged in the charging process can be improved.

Preferably, the circuit board further includes a short-circuit protection module (not shown in figures).

By providing the short-circuit protection module on the circuit board, safety of the device to be charged in the charging process can be further improved.

Preferably, the circuit board is provided with an insertion portion 50 on a side adjacent to the fixing insertion plate 30, with the insertion portion configured to be inserted into a slot (not shown in figures) of the mainboard of the computer.

By providing the circuit board with the insertion portion 50, configured to be inserted into the slot of the mainboard of the computer, on the side adjacent to the fixing insertion plate 30, the direct-current power supply expansion card can be directly inserted into PCI, PCEI slots of the mainboard of the computer as other computer hardware, such as graphic card and audio card. The insertion portion 50 in the present embodiment mainly serves a function of further fixing the expansion card.

Preferably, the direct-current power supply expansion card further includes a protection cover 60, and the protection cover 60 is fixed on the circuit board by a bolt.

Specifically, by providing the protection cover 60 on the direct-current power supply expansion card, and fixing the protection cover 60 on the circuit board by a bolt, the expansion card can be better protected, and accidents such as short circuit due to contact of a circuit thereon with other parts in the host case are prevented.

Preferably, the protection cover 60 is provided with heat dissipation holes 61.

By providing the heat dissipation holes 61 on the protection cover 60, heat generated by the expansion card in operation can be more quickly dissipated out, and the service life of the expansion card is prolonged.

The above-mentioned are only for preferred embodiments of the present disclosure, and the patent protection scope of the present disclosure is not limited thereby. Within the concept of the present disclosure, equivalent structural variations made to the description and figures of the present disclosure, or direct/indirect use in other related technical fields should be covered within the patent scope of protection of the present disclosure.

The invention claimed is:

1. A direct-current power supply expansion card, wherein the direct-current power supply expansion card comprises a circuit board, an input interface provided on the circuit board, a direct-current output interface provided on the circuit board, and a fixing insertion plate connected with the circuit board, and the fixing insertion plate is configured to fix the circuit board on a host case,
wherein the input interface comprises a D-type 4 pin power connector, the direct-current output interface comprises at least one of a 5 v direct-current interface and a 12 v direct-current interface provided on a side close to the fixing insertion plate, and the direct-current power supply expansion card further comprises a protection cover, and the protection cover is fixed on the circuit board by a bolt,
wherein the circuit board further comprises a self-locking switch provided on a side of the fixing insertion plate and adjacent to the direct-current output interface.

2. The direct-current power supply expansion card of claim 1, wherein the circuit board is provided with an insertion portion on a side adjacent to the fixing insertion plate, with the insertion portion configured to be inserted into a slot of a mainboard of a computer.

3. The direct-current power supply expansion card of claim 1, wherein the fixing insertion plate is further provided with through holes in positions corresponding to the direct-current output interface and the self-locking switch.

4. The direct-current power supply expansion card of claim 3, wherein the circuit board is provided with an insertion portion on a side adjacent to the fixing insertion plate, with the insertion portion configured to be inserted into a slot of a mainboard of a computer.

5. The direct-current power supply expansion card of claim 1, wherein the protection cover is provided with heat dissipation holes.

* * * * *